July 4, 1944.                    W. D. BELL                      2,352,763
                       APPARATUS FOR SEALING CONTAINERS
                       Filed Jan. 17, 1940            6 Sheets-Sheet 1
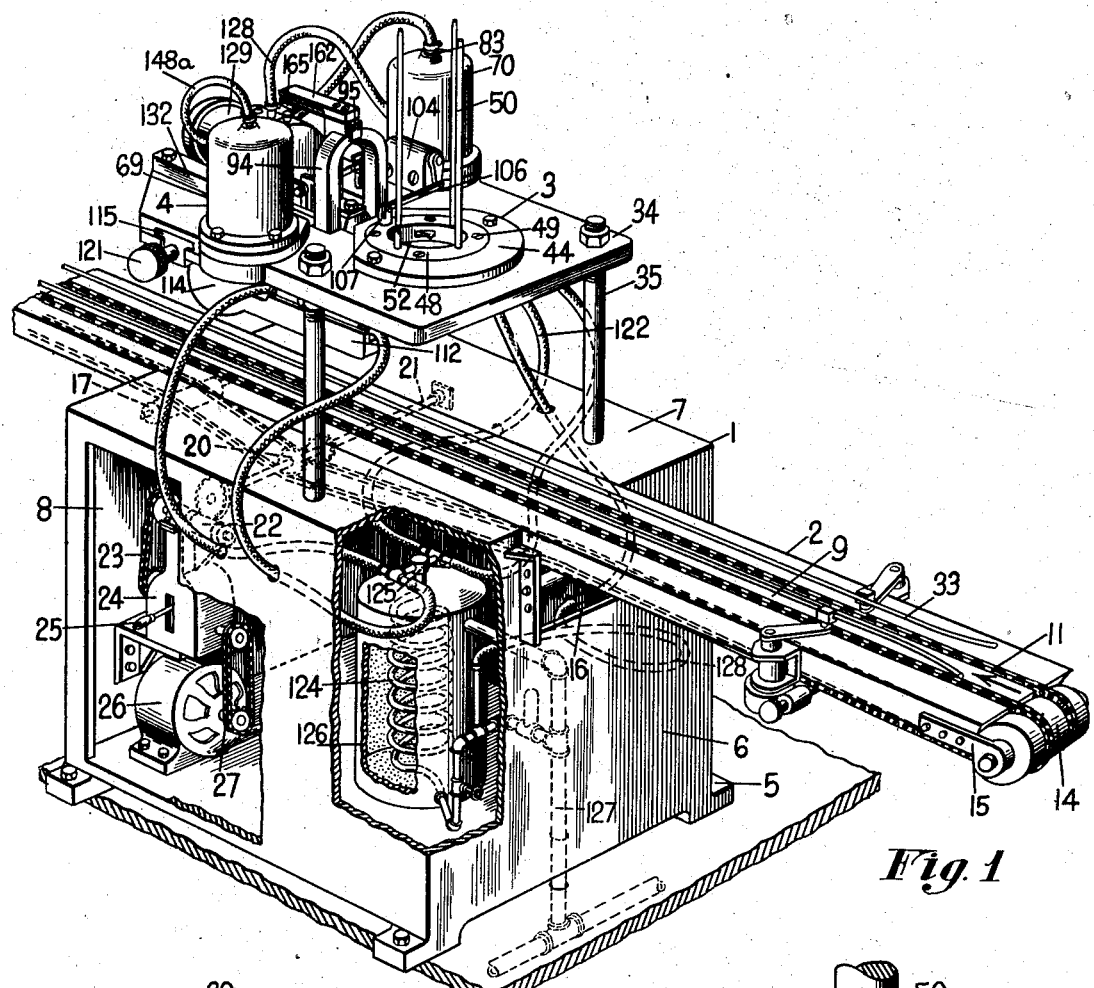
Fig. 1
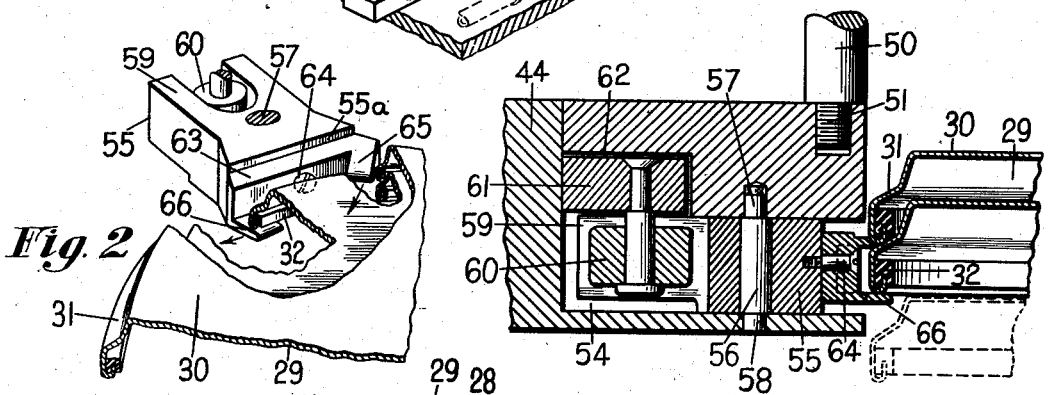
Fig. 2
Fig. 3
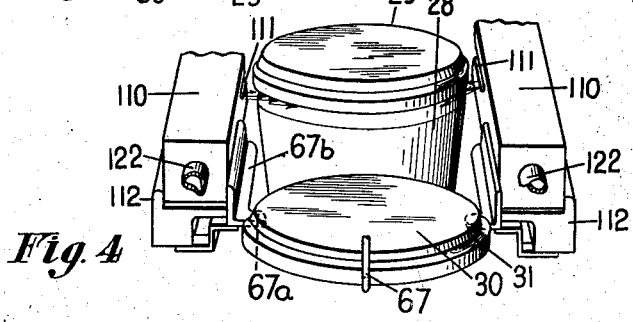
Fig. 4
INVENTOR
William D. Bell.
BY Corbett & Mahony
ATTORNEYS July 4, 1944.  W. D. BELL  2,352,763
APPARATUS FOR SEALING CONTAINERS
Filed Jan. 17, 1940  6 Sheets-Sheet 2
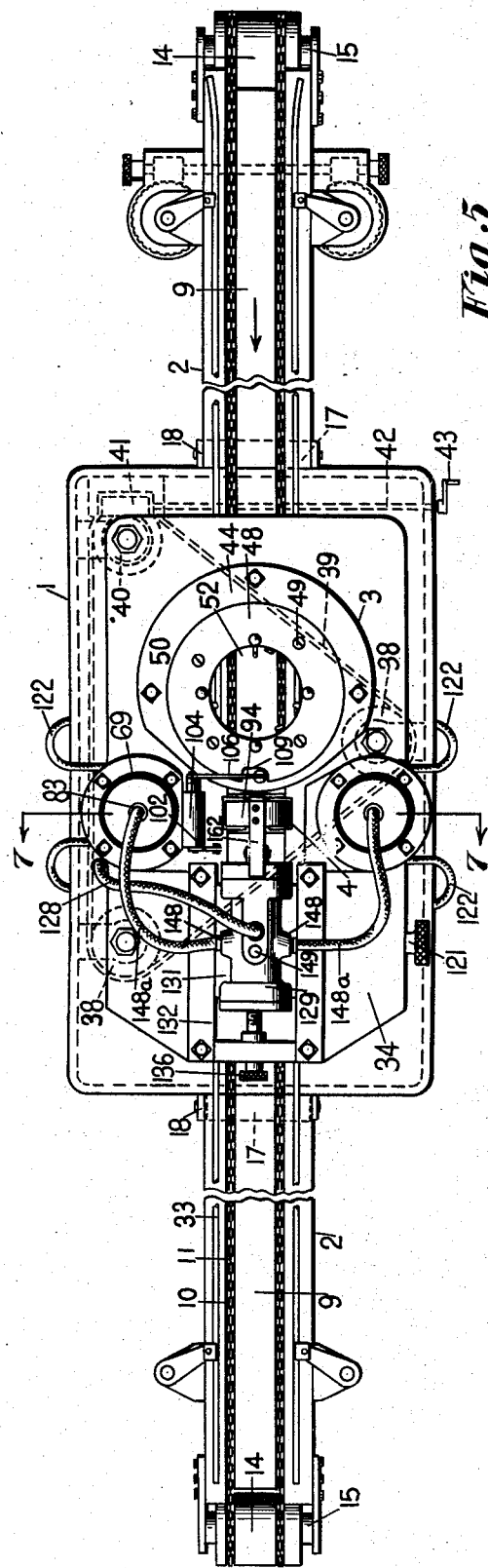
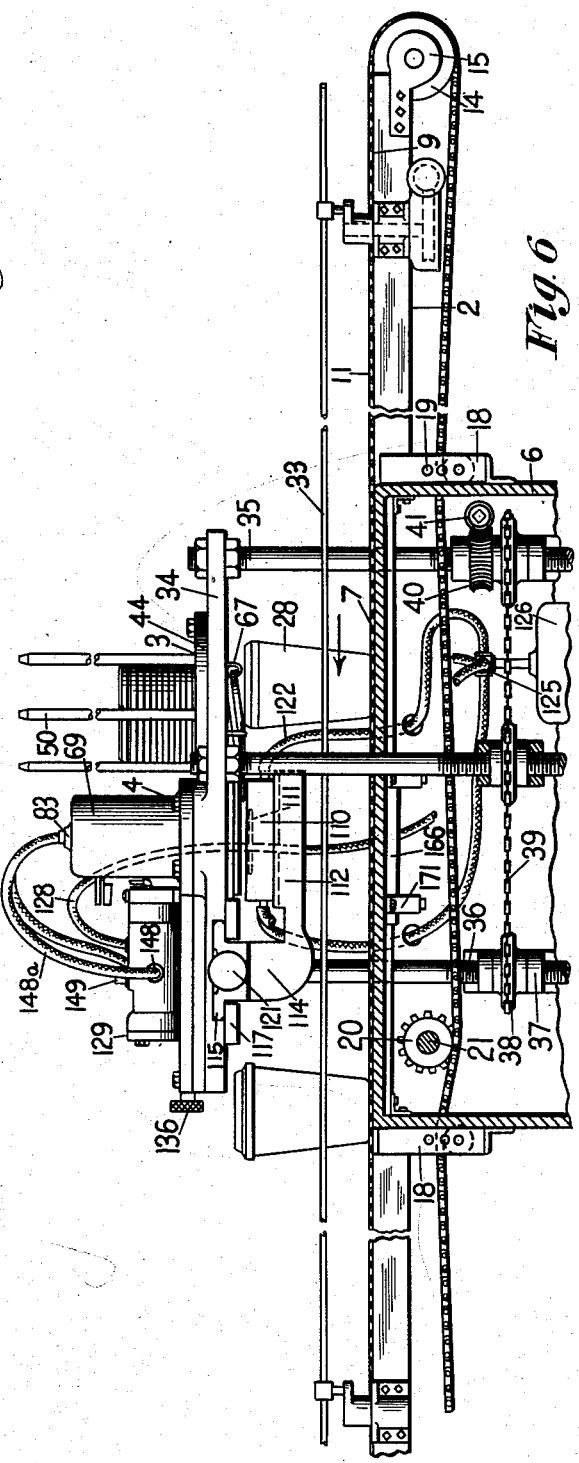
INVENTOR
William D. Bell.
BY Corbett + Mahoney
ATTORNEYS July 4, 1944.   W. D. BELL   2,352,763
APPARATUS FOR SEALING CONTAINERS
Filed Jan. 17, 1940   6 Sheets-Sheet 6

INVENTOR
William D. Bell.
BY Corbett + Mahoney
ATTORNEYS

Patented July 4, 1944

2,352,763

UNITED STATES PATENT OFFICE 2,352,763

APPARATUS FOR SEALING CONTAINERS

William D. Bell, Columbus, Ohio, assignor to Anchor-Hocking Glass Corporation, Lancaster, Ohio, a corporation of Delaware Application January 17, 1940, Serial No. 314,299

21 Claims. (Cl. 226—82)

My invention relates to an apparatus for sealing containers. It has to do, more particularly, with an apparatus for applying closures to containers, such as food containers and including jars, bottles, cans, et cetera, and sealing them on the containers and for producing a partial vacuum in the upper ends of the containers.

One of the objects of my invention is to provide a greatly simplified apparatus for applying and sealing closures on containers and for creating an effective vacuum in the space at the upper end of the container between the closure and the contents of the container which will aid in preventing spoilage of the contents and will also aid in keeping the closure in position on the container.

Another object of my invention is to provide apparatus of the type indicated which is of such a nature that the closure and the upper end of the container and the head space between the contents and the closure will be sterilized during the sealing operation.

Another object of my invention is to provide an apparatus of the type indicated which will vacuumize and seal the container quickly and effectively.

Another object of my invention is to provide a machine of the type indicated which is of a very simple structure and, therefore, can be built at a relatively low cost, which will occupy a small amount of space, and which is composed of a minimum number of parts tending to wear or become inoperative.

Another object of my invention is to provide a machine of the type indicated which may be adjusted readily to operate upon containers of various sizes.

Another object of my invention is to provide a machine which will be continuous in operation and which will perform its operation without handling of the containers by an operator.

Another object of my invention is to provide a machine of the type indicated wherein the sterilizing and vacuumizing is accomplished with steam and wherein the sealing means is also operated by steam which makes it possible to provide a very simple and compact machine.

This application is a continuation in part of my co-pending application, Serial No. 266,914, filed April 8, 1939.

In its preferred form, my invention contemplates the provision of a simple apparatus for applying closures to and sealing them on various containers such as jars, bottles, cans, etc. The apparatus comprises a continuously moving conveyor upon which the filled containers are placed indiscriminately. Means is provided in association with the conveyor for centering and maintaining the containers centered on the conveyor. The containers are first moved by the conveyor to a cap feeding and applying unit where caps or other closures are loosely positioned on the upper ends of the containers. The containers are then moved to a point where a sealing head is disposed. The sealing head and the cap feeding and applying unit are preferably disposed directly adjacent each other. The sealing head is spaced slightly above the upper ends of the containers. Associated with the sealing head is means for forcing it downwardly whenever a container, having a cap properly associated therewith, moves beneath the sealing head. This will force the cap downwardly into frictional engagement with the upper end of the container. The cap feeding and applying unit is connected to the sealing head so that each time the sealing head is actuated, a cap is fed from the cap feeding unit into position to be engaged by the next container. The sealing head has means associated therewith for automatically lifting the cap from the upper end of each container and for injecting steam into the head space at the upper end of each container to displace the air therefrom, both of these operations being performed substantially simultaneously just prior to the sealing of the cap on the container. After the cap is sealed on the container, the steam previously injected into the head space of the container will condense, creating an effective vacuum within the container which will aid in holding the cap in position and will also aid in preventing spoilage of the contents of the container. Since I provide steam for sterilizing and vacuumizing, I have found that it is also very desirable to use steam as the force for moving the sealing head downwardly. During the sealing operation, the container is stationary and the conveyor continues to move therebeneath. However, as soon as the pressure produced by the sealing head is eliminated, the container will again be moved by the conveyor away from the sealing head.

It will be understood that if the contents of the container is porous, air will not only be removed from the head space above the contents but also from the contents.

Various other objects and advantages will be apparent from the following description.

The preferred embodiment of my invention is illustrated in the accompanying drawings, wherein similar characters of reference designate corresponding parts and wherein:

Figure 1 is a perspective view, partly broken away, of the main portion of a machine constructed in accordance with my invention.

Figure 2 is a detail mainly in perspective of a portion of the cap feeding unit.

Figure 3 is a detail in vertical section of a portion of the cap feeding unit.

Figure 4 is a detail in perspective showing the means for injecting steam beneath the cap and to the upper end of the container.

Figure 5 is a plan view of my machine.

Figure 6 is a vertical sectional view taken longitudinally through the machine illustrated in Figure 5.

Figure 7:
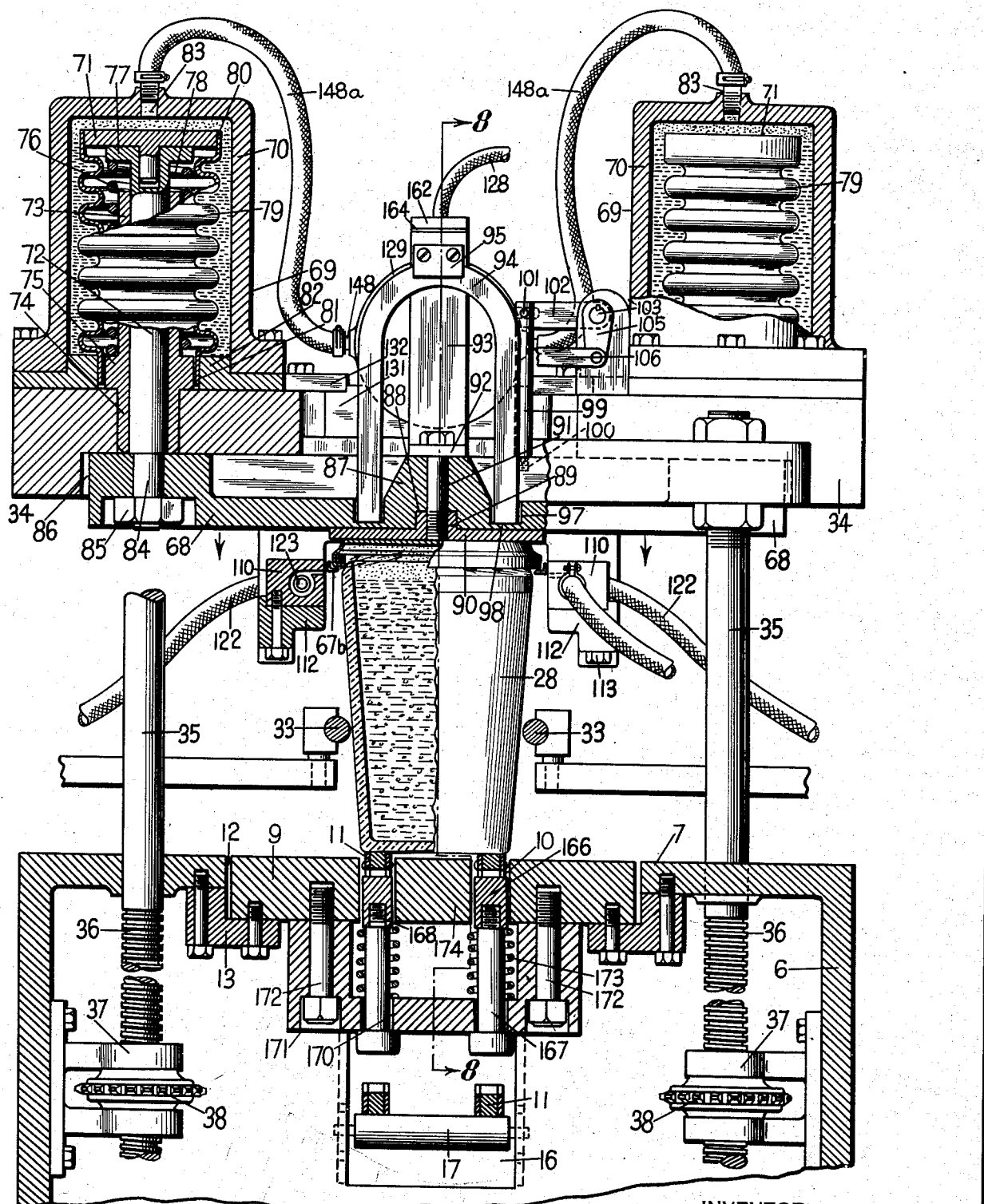
Figure 7 is a transverse vertical sectional view taken substantitally along line 7—7 of Figure 5 but being enlarged.

With reference to the drawings, I have illustrated a machine which comprises generally a table 1 supporting a horizontal conveyor unit 2 on its upper end (Figures 1, 5 and 6), a cap feeding and applying unit 3, and a sealing head unit 4.

The table 1 may be made of steel or cast iron plates or of other material. It comprises leg portions 5, which may be secured to the floor, and an upper housing portion 6. The top of the housing is formed by the top plate 7 of the table. A removable plate may be provided at the side of the housing for covering a large opening 8 through which access to the interior of the housing may be gained. The interior of the housing is adapted to contain certain operating mechanism of the machine.

The conveyor unit comprises a longitudinally extending plate 9 (Figures 1, 5, 6, 7 and 8) which is provided with a pair of longitudinally extending grooves 10 which are parallel with each other and which are adapted to receive parallel chains 11 of the conveyor. The plate 9 is horizontally disposed and extends through a recess 12 (Figure 7) formed in the top plate 7 of the table and extending longitudinally therethrough. The plate is held in position by L-shaped brackets 13 bolted to the lower surface of the plate 7 and the lower surface of the plate 9. The plate 9 projects a considerable distance from each end of the table, as indicated in the drawings. The top surface of the plate 9 is substantially flush with the top surface of the plate 7.

The chains 11 are endless sprocket chains. They pass around a grooved roller 14 supported at each end of the plate 9. Each grooved roller is rotatably carried by a pair of brackets 15 secured to the end of the plate 9. The chains will pass through the grooves 10 formed in the plate 9. As indicated best in Figure 8, the top edge of each chain 11 will project slightly above the top surface of the plate 9. Thus, articles placed on the conveyor will be supported by the pair of chains 11, which are closely adjacent each other, and the bottom of the articles will not contact with the upper surfaces of the plate 9. Furthermore, the upper flights of the chains will slide along the bottoms of the grooves 10 formed in the plate 9. The lower flights of the chains 11 will pass beneath the plate 9 and through an opening 16 (Figure 1) formed in each end of the housing 6. Extending transversely of each of these openings is an idler roller 17 which prevents the chains from sagging too much, when the driving force is applied thereto in a manner to be described. Each roller 17 is carried by a pair of brackets 18 secured to the outer surface of the housing adjacent the openings 16. Each bracket is provided with a series of vertically spaced openings 19 so that the roller may be positioned at different levels. The chains are driven by means of a pair of sprockets 20 (Figures 1 and 6). These sprockets are carried by a transversely extending shaft 21 which is supported for rotation by the side walls of the housing 6. The sprockets 20 are keyed on the shaft 21 and are disposed above the lower flights of the chains.

The shaft 21 is driven by a worm and gear unit 22 associated with one end thereof. This worm and gear unit 22 is driven by a chain and sprocket drive 23 from a multi-speed gear unit 24 which is operated by a hand lever 25. An electric motor 26, secured to the base of the housing drives the unit 24 through the medium of a chain and sprocket drive 27. Thus, the conveyor unit is normally driven continuously. The speed of movement of the conveyor may be varied by operating the lever 25.

The containers 28 are placed indiscriminately on the conveyor and are moved in the direction of the arrows (Figures 1 and 5) by the conveyor. My invention is not limited to any particular type of container and cooperating cap but for illustrative purposes I have shown in Figure 7 a tumbler adapted to receive the cap 29 on its upper end. This cap preferably embodies a substantially disk-like portion 30 which has a depending annular skirt 31 which carriees an annular gasket 32 therewithin. When the cap is forced downwardly onto the upper end of the container 28, the frictional contact of the gasket with the upper end of the container will aid in maintaining the cap in position and will seal the cap on the container.

In order to center the containers transversely of the conveyor and to maintain them centered, I provide a pair of longitudinally extending guide rails 33. These guide rails are supported on opposite sides of the conveyor in such a manner that they may be adjusted towards and away from each other. They are supported and adjusted in the manner disclosed in the co-pending application of Harold H. Snyder et al., Serial No. 294,274, filed September 11, 1939, for Guide rails for conveyers. Thus, these guide rails will center the containers on the conveyor, as they are moved between the rails, and will maintain them centered on the conveyor during the various operations performed by the machine.

After the containers are positioned on the conveyor, they are first carried to the cap feeding and applying unit 3. This unit is of such a type that it will apply a cap loosely to the upper end of the container. After the container passes the unit 3, it passes to the sealing head unit 4. This sealing head unit 4 is adapted to displace the air from the head space and to sterilize such space and the cap before the sealing operation.

The units 3 and 4 are disposed directly adjacent each other. They are both supported by a horizontally disposed plate 34. The plate 34 is supported at a point spaced above the table 7 by means of a plurality of vertically disposed posts 35. These posts may be in any suitable number although I show 3. These posts extend downwardly through the top plate 7 of the table on opposite sides of the conveyor. They are free to move vertically in the openings in the top plate 7. As shown best in Figures 6 and 7, the lower end of each of these posts is threaded, as indicated at 36. The lower end of each passes through openings formed in a U-shaped bracket 37 which is secured to the wall of the housing 6. The threaded portion is free to slide through the openings in the bracket 37. Between the legs of each of the brackets 37 a sprocket 38 is disposed. This sprocket has a threaded opening with which the threaded portion 36 of the posts cooperates. All of the sprockets 38 are adapted to be rotated simultaneously by means of a sprocket chain 39. One of the sprockets 38 has a worm gear portion 40 (Figure 6) formed thereon. This portion is engaged by a worm 41. The worm 41 is carried on the end of a transversely extending shaft 42 which may be rotated by a crank 43 keyed to the opposite end thereof.

It will be apparent that if the crank 43 is rotated, the worm 41 will rotate the sprocket 38 having the worm gear 40 formed thereon. This will cause the chain 39 to rotate the other two sprockets 38. Since all of the sprockets are prevented from moving vertically, the posts 35 will all be fed vertically, simultaneously and relative to the sprockets. This, in turn, will produce vertical movement of the plate 34. Thus, the plate 34 may be adjusted vertically to position the units 3 and 4 at the proper height above the conveyor, depending upon the height of the containers to be sealed.

Figure 8:
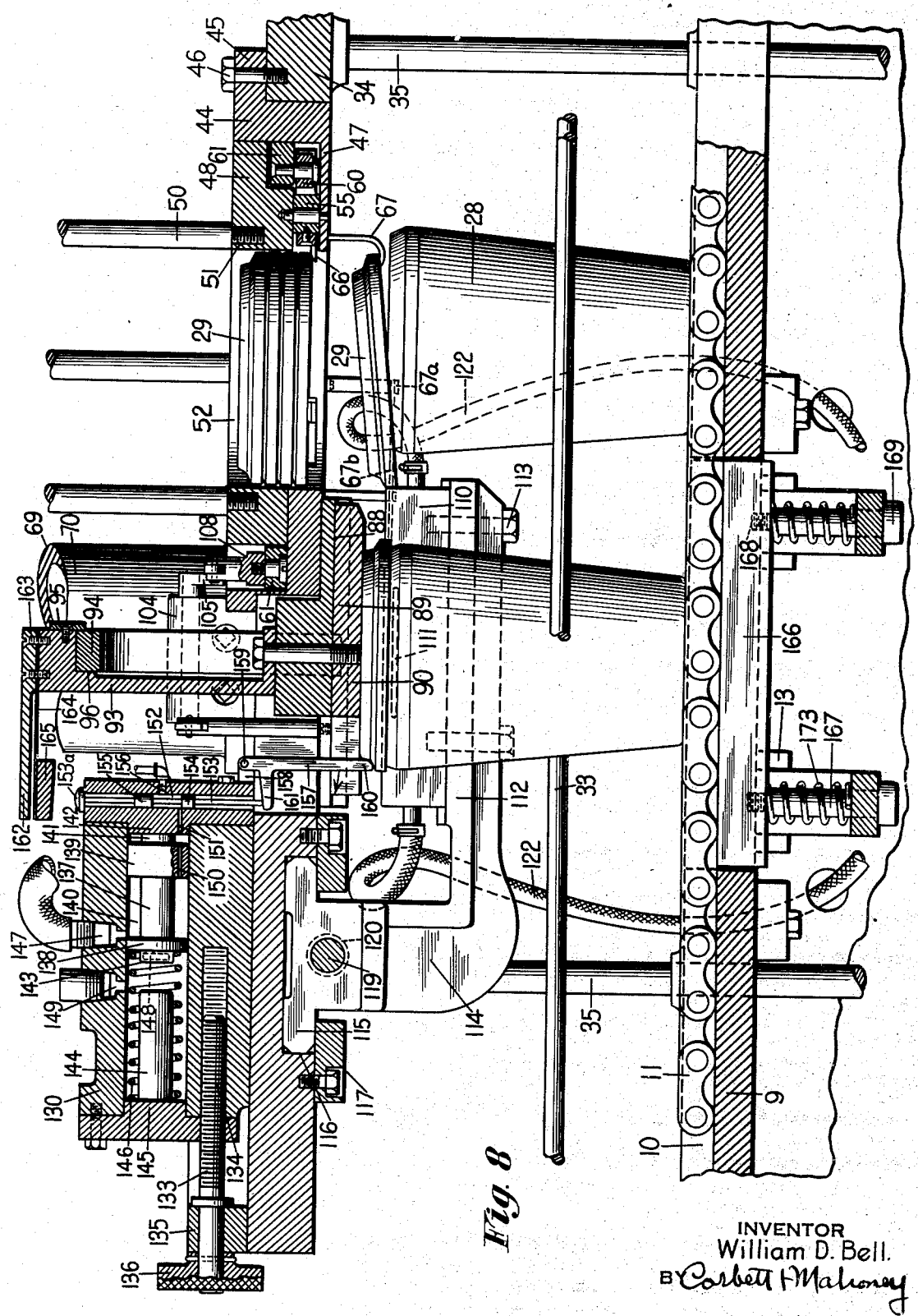
Figure 8 is a vertical sectional view taken substantially along line 8—8 of Figure 7.
Figure 9:
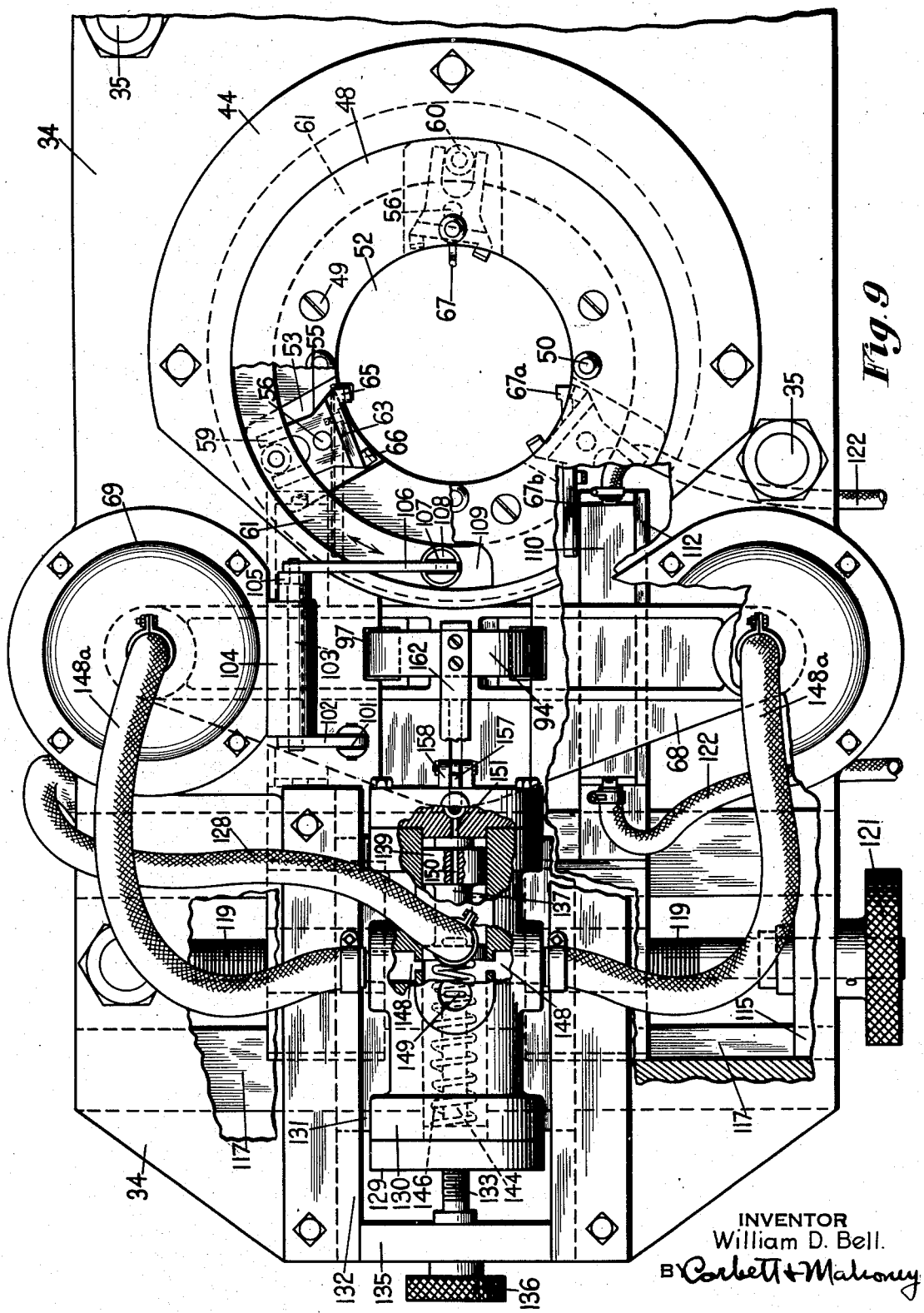
Figure 9 is a plan view, partly broken away, of the units shown in Figure 8.

The cap feeding and applying unit 3 is illustrated best in Figures 1, 5, 6, 8 and 9. This unit comprises an annular member 44 which fits in an opening formed in the plate 34. This member is provided with a peripheral flange 45 which rests on the top of plate 34 and which may be bolted thereto by means of bolts 46. On its lower edge the member 44 is provided with an inwardly projecting shelf-like portion 47. The member 44 has its lower surface substantially flush with the lower surface of the plate 34. The member 44 receives an annular collar 48 which may be slipped thereinto and which will rest on the portion 47 thereof. This member is held in position by means of screws 49 (Figures 1 and 9). The member 48 carries four upstanding posts 50. Each of these posts is provided with a reduced threaded lower end 51 which is adapted to be screwed into a cooperating threaded opening formed in the member 48. The posts 50 are disposed adjacent the central opening 52 formed within the collar 48. This opening is of such a size as to permit the caps to drop therethrough. A stack of nested caps is adapted to be disposed within the posts 50.

For controlling the movement of the caps through the opening 52, formed within member 48, I provide the following structure. At suitable circumferentially spaced intervals, the collar 48 is provided with apertures or notches 53 formed in the bottom portion thereof. These apertures extend inwardly entirely through the collar 48, as indicated in Figure 3. The inner end of each aperture communicates with a chamber 54 formed in the annular member 44 in alignment therewith. In each chamber formed by an aperture 53 and a cooperating chamber 54, an escapement member 55 is disposed. Each of the members 55 is pivotally mounted, as indicated in Figure 3. The pivot pin 56 is carried by the member 55 intermediate the inner and outer ends thereof. The upper end of the pivot pin 56 is rotatably carried by the member 48, as at 57, while the lower end of the pivot pin is rotatably carried by the portion 47 of the member 44, as at 58.

The inner end of each member 55 is provided with a bifurcated portion 59. Each of these portions 59 has a roller 60 disposed therebetween (Figures 3 and 9). These rollers 60 are carried at properly circumferentially spaced intervals by a ring 61. The ring 61 is disposed in an annular space 62 formed within the collar 48 at the lower and inner edge thereof. The ring 61 is free to rotate slightly or oscillate relative to the member 48. When the ring is rotated, all of the members 55 are swung about their pivot points 56. Each of the members 55 has a flat outer end 55a (Figure 2). A member 63 is disposed in abutting relationship to this surface. This member 63 is pivoted to the member 55 by a pivot pin 64. Each member 63 is provided with an outwardly projecting upper knife-like finger 65 and lower knife-like finger 66.

Normally the members 55 will be in such a position that the lower fingers 66 will project outwardly beyond the wall of the opening 52. Consequently, the lowermost cap of the stack will rest on these fingers 66 and will be prevented from dropping through the opening 52. At this time the fingers 65 will not project into the opening 52. However, when the ring 61 is rotated in the proper direction, it causes the members 55 to pivot in such a manner that the fingers 66 will be withdrawn inwardly from the opening 52 and the fingers 65 will be swung outwardly into the opening. This will permit the lowermost cap to drop while the cap next above will be engaged by the fingers 65 and will be prevented from dropping. As soon as the ring 61 is rotated to its original position, the fingers 65 will again be withdrawn from the opening 52 allowing the stack of caps to drop onto the fingers 66, which will again be projected into the opening 52. Thus, rotation of the ring 61 will permit one of the caps to drop from the opening 52. The member 63 is free to move slightly about the pivot 64 to prevent jamming of the feeding device. The movement is limited, as indicated in Figure 3, by the member 48 disposed thereabove and the portion 47 of member 44 disposed therebelow. Thus, it will be apparent that the caps will be fed one by one from the opening 52. The cap released from the stack will drop downwardly and will be received by a hook 67 depending from the portion 47 of member 44 and disposed (Figure 4) adjacent and behind the opening 52 and a pair of fingers 67a which are formed on guide members 67b. These members 67 and 67a will support the cap in a downwardly inclined position, as indicated in Figure 8, so that as a container is moved beneath the cap by the conveyor, the upper edge of the container will engage the forward portion of the skirt of the cap and will pull it off the members 67 and 67a allowing it to drop into position on the flanges of members 67b. The members 67b are disposed in parallel relationship and extend longitudinally of the path of movement of the containers. They are spaced apart, as indicated best in Figure 7, a distance slightly less than the diameter of the cap. However, the upper end of the container will still project slightly above the horizontal flanges of these members. Thus, the upper end of the container will move the cap along members 67b until it moves off such members at which time it will be beneath the sealing head unit 4. Members 67b serve to prevent the cap from sticking onto the upper end of the container prior to the sterilizing and sealing operations. These members are supported in a manner which will be described subsequently. Thus, a cap will be applied loosely to a container as it moves beneath the unit 3 and into position under the unit 4.

The sealing head unit 4 is illustrated best in Figures 1 and 5 to 9 inclusive. It comprises a flat plate 68 which is mounted beneath the plate 34 (Figure 7). This plate 68 is adapted to be moved downwardly by a pair of steam cylinder and piston units 69. Each of the units 69 comprises a cylindrical housing 70 in which a piston 71 is disposed for vertical movement. This piston has a rod 72 which extends downwardly through a sleeve 73 disposed centrally within the housing 70. The lower end of this sleeve has a portion 74 which fits within an opening formed in the plate 34. The sleeve 73 is provided with a shoulder 75 which contacts with the upper surface of the plate 34 and prevents further movement through the opening in the plate. The upper end 76 of the sleeve 73 is adapted to contact with a flange 77 formed on the upper end of rod 72 in order to limit downward movement of the piston 71. Normally the edge 76 and the flange 77 are spaced apart, as indicated in Figure 7. A compression spring 78 is disposed in surrounding relationship to the rod 72 between the shoulder portion 75 of sleeve 73 and the flange 77 of rod 72. This spring normally keeps the rod in its uppermost position. A bellows-type sleeve 79 has its upper end secured to the periphery of piston 71, as at 80, and its lower end suitably secured, as at 81, to the edge of a central opening formed in the head 82 of the cylinder 70. This member 79 serves to prevent leakage of steam from the cylinder around the piston rod 72 or sleeve 73. Downward movement of the piston 71 and connected piston rod 72 is accomplished by allowing steam to enter into the cylinder 70 through the inlet 83.

The lower end of each of the piston rods 72 has a reduced portion 84 which fits in an opening formed in the plate 68. A nut 85 threaded on the reduced portion 84 holds the plate in position on the rod. When the plate 68 is in its uppermost position as shown in Figure 7, it fits within a recess 86 formed in the lower surface of the plate 34. The plate 68 is provided with a centrally disposed upstanding boss 87 on its upper surface. On the lower surface of the plate beneath the boss 87 is a recess 88. This recess is adapted to receive a rib 89 formed on the upper surface of a small sealing plate 90. The plate 90 will be of a suitable size depending on the size of the cap to be forced on the container. It may be removed and replaced with a plate of a different size. It is normally held in position tightly against the lower surface of the plate 68 by means of a bolt 91 which passes down through an opening in the boss 87 and which has its lower end threaded into a threaded opening formed in the rib 89. The bolt 91 also passes through the horizontal portion 92 of an upstanding support 93. The head of the bolt clamps the portion 92 of the support 93 to the boss 87. A horseshoe magnet 94 is clamped to the support 93 by means of a clamp member 95 which clamps the upper end of the magnet against the surface 96 (Figure 8) of the support 93. The legs of the magnet 94 extend downwardly and have their lower ends disposed in recesses 97 formed in the upper surface of the plate 68. Thus, only a thin section 98 of the material of the plate 68 is between each end of the magnet and the plate 90. The plate 90 is of magnetic material while the plate 68 and the support 93 are of non-magnetic material. Thus, the plate 90 will be magnetized by the magnet 94. It will be apparent that when the plate 68 moves vertically, the magnet 94 will move therewith.

In order to actuate the cap feeding and applying unit 3 each time the sealing head 4 is actuated, I provide means for connecting the vertically movable plate 68 of the unit 4 to the rotatable ring 61 of unit 3. For this purpose the plate 68 is provided with an upstanding post 99 which has its lower end threaded into an opening in the upper surface of the plate, as at 100 (Figure 7). This post has its upper end pivotally connected as at 101 to a crank arm 102 which is keyed to one end of a shaft 103 (Figure 5) which is rotatably mounted in a suitable bearing 104 carried by the upper surface of the stationary plate 34. The opposite end of this shaft has keyed thereto a crank arm 105 which has its lower end pivotally connected to a link 106. This link has it opposite end pivotally connected as at 107 to the upstanding member 108 (Figure 8) which has its lower end attached to the ring 61. A slot 109 is provided in the collar 48 to permit movement of the member 108 so that it will rotate the ring 61. It will be apparent that when the plate 68 is moved downwardly the ring will be rotated in one direction and when it is moved upwardly, the ring will be rotated in the opposite direction. Thus, each time the sealing head is actuated, the cap feeding device will be actuated to release a cap from the stack.

In order to sterilize the caps and the upper portion of the containers, and in order to inject steam into the upper ends of the containers I provide the following structure. Below the plate 68 I provide a pair of steam jet members 110. These members 110 are elongated and are disposed in spaced parallel relationship, as indicated in Figure 7, on opposite sides of the path of movement of the container. They are located at such a height that they are disposed substantially at the upper end of the container when it is being sealed. The members 110 are spaced downwardly from the plate 68 a distance sufficient to permit the required downward movement of the plate 68 in order to seal the cap on the container. Each of the members 110 is provided with a jet opening 111 on its inner edge which takes the form of an elongated slot as illustrated best in Figure 8.

Each of the members 110 is carried on the upper side of a horizontally disposed arm 112 (Figure 8) to which it is suitably secured, as by bolts 113. These arms 112 also support members 67b. Each arm 112 at its one end is provided with an upstanding portion 114 which has a guide portion 115 formed on its upper end. This guide portion 115 cooperates with a guideway 116 formed by a recess in the lower surface of the plate 34 and guide members 117 suitably bolted to the lower surface of the plate 34. Thus, the arms 112 are mounted for sliding movement towards and away from each other. To adjust these members towards and away from each other, I provide a screw member 119. This screw member is provided with oppositely threaded portions which cooperate with threaded openings 120 formed in the portions 114 of members 112. This screw member is rotatably supported by the plate 34 and may be rotated by means of a knurled nut 121. When the nut 121 is rotated, the arms 112 and, consequently, the members 110 will be moved towards or away from each other. Thus, the distance between the members 110 may be varied according to the size of the caps and the upper end of the containers.

In order to supply steam to each of the members 110 I provide a flexible conduit 122 connected to each end of a longitudinal passageway 123 extending through the member 110 (Figure 7) and which communicates with the jet opening 111. All four of these flexible conduits 122 are connected to the upper end of a coil 124 (Figure 1), as at 125, which forms a part of a steam super heater 126 disposed in the housing 6. The super heater 126 is substantially identical with that disclosed in my co-pending application S. N. 266,914 filed April 8, 1939, and need not be described in detail. Thus, the steam applied to the members 110 will be dried or super heated and will serve more effectively to produce a vacuum in the upper end of the container. The super heater 126 is connected to line 127 which is connected to the boiler. A flexible steam line 128 is also connected to the line 127. This line 128 has its opposite end connected to the control valve 129 which is supported on top of the plate 34.

The control valve 129 is steam operated and is adapted to control flow of steam to the pair of cylinders and piston units 69. This valve will be actuated at the proper instant to supply steam to the units 69. The valve 129 is shown best in Figures 8 and 9. It comprises a cylindrical housing 130 which has laterally extending guide portions 131 formed thereon which extend into guideways 132 formed on the top of the plate 34. A screw 133 is threaded into the housing 130, which is horizontally disposed, as indicated at 134. This screw is rotatably mounted in a support 135 secured to the upper surface of 34 but will not move longitudinally relative thereto. Thus, the housing 130 may be adjusted axially of itself. This adjustment is provided for a purpose which will be referred to hereinafter. The screw 133 is rotated by a knurled knob 136.

The housing 130 has a piston 137 slidably mounted therein. This piston has a head 138 formed on the left hand end thereof (Figure 8) and a head 139 formed on the right hand end thereof. The head 138 is relatively narrow and the head 139 is relatively wide. An annular space 140 is formed between the heads 138 and 139. The head 139 has a short extension 141 formed thereon which is adapted to contact with the right hand end or head 142 of the housing to keep it spaced slightly therefrom. The head 138 of the piston is provided with a small extension 143 adapted to contact with the inner end of a pin 144 formed integral with the left hand head 145 of the housing. A compression spring 146 is disposed in surrounding relationship to the pin 144. This spring 146 will normally maintain the piston 137 in the position illustrated in Figure 8 since it bears against the head 145 and the head 138. The housing 130 is provided with a steam inlet 147 which is connected to the line 128. It is also provided with a pair of diametrically opposed steam outlets 148. Each of these outlets is connected to a flexible conduit 148a which is connected to the inlet 83 of one of the cylinder and piston units 69. The inlet 147 is spaced a short distance longitudinally of the housing from the outlets 148. An exhaust opening 149 is also provided and it is spaced to the left of the outlets 148. Normally, the valve is in the position indicated in Figure 8 with the head 138 of the piston disposed between the inlet 147 and the outlets 148. Consequently, steam will not flow to the cylinder and the piston units 69 through the outlets 148. Also, the inlet 147 will not be in communication with the exhaust opening 149.

Steam from the conduit 128 normally flows through the inlet 147 into the annular space 140. The head 139 of the piston is provided with a small bore 150 through which the steam will flow. The head 142 is provided with a similar bore 151 which is in communication with a vertical bore 152 formed in the head 142. A plunger 153 is slidably mounted in the bore 152. This plunger is provided with enlarged portions 154 and 155 which fit tightly within the bore. The plunger is further provided with a head 153a which limits downward movement of the plunger. When in its lowermost position, the plunger will project a short distance from the lower end of the bore. Also, when the plunger is in its lowermost position the portion 154 will be below the bore 151. An exhaust opening 156 communicates with the bore 152 and is disposed between the portions 154 and 155 of the plunger. Thus, normally the steam will exhaust from the space 140 through bore 150, bore 151, bore 152 between portions 154 and 155 and finally through the exahust opening 156. The exhaust opening is small so that only a relatively small amount of steam will exhaust. When the plunger 153 is moved upwardly, the portion 154 will cover the bore 151. This will close the bore 151 and interrupt the exhaust of the steam. Consequently, the steam will build up pressure behind the piston 137 forcing it to the left against the pressure of the spring 146. This will move the head 138 of the piston to a point just slightly beyond the outlets 148. Consequently, communication between the inlet 147 and the outlets 148 will be established. Therefore, steam will be supplied to the cylinder and piston units and will cause them to move the plate 68 downwardly forcing the cap on the container. When the plunger 153 is returned to its original position so that the bore 151 will be opened and the steam will exhaust from the right hand end of the housing 130, the piston 137 will be returned to its original position by the spring 146. The plate 68 will be moved upwardly by the springs 78 of the units 69. The steam will exhaust from the housings 70 through the conduits 148a, through the inlets 148 into the housing 130 and from this housing to the atmosphere through the exhaust 149. The housings 70 may be partly filled with water, as indicated in Figure 7, so only a relatively small amount of steam will be required for moving the pistons 71.

In order to move the plunger 153 upwardly to cause actuation of the sealing head unit I provide a trigger 157 which will be actuated each time a container with a cap thereon is moved beneath the sealing head unit. The trigger will be actuated only when the container has a cap thereon and, consequently, there will be no danger of crushing the upper end of a container if it is moved beneath the sealing head unit without a cap. This trigger is pivoted to an extension 158 of the valve housing, as at 159. It extends downwardly through aligning slots formed in the plates 34, 68 and 90. When the plate 68 is in its uppermost position, the trigger 157 still extends a short distance below the plate 90 as indicated at 160 (Figure 8). When the container with a cap thereon is moved beneath the plate 90 by the conveyor, the cap which is moved off members 67b is lifted against the plate 90 by means of the magnet 94. However, the upper end of the container will still engage the skirt of the cap. The conveyor will tend to move the container along, which will also tend to slide the cap relative to the plate 90. This causes the cap to engage the lower end of the trigger 157, as shown in Figure 8, and swing it in the direction of the arrow about its pivot 159. This causes a horizontally extending arm 161, which is formed thereon, to move the plunger 153 upwardly and thereby close the bore 151. This operates the cylinder and piston units 69 in the manner previously described.

As the plate 90 and the plate 68 are moved downwardly, the cap is forced onto the container and will ultimately be moved out of engagement with the lower end of the trigger 157. This will permit the trigger to swing back to its original vertical position. A horizontal extension 162 is secured to the upper end of the member 93. This extension 162 is fastened to member 93 by screws 163. A leaf spring 164 is clamped between members 162 and 93. This leaf spring is disposed below member 162 and extends parallel thereto. On its outer end it is provided with a member 165 which is adapted to engage the head 153a of the plunger 153 when the plate 68 moves downwardly to its lowermost position. When the plate reaches its lowermost position, the member 165, due to its resilient mounting, will continue to move slightly and will engage the head 153a and will return plunger 153 to its original position. The member 162 serves to prevent excessive oscillation of the member 165. Thus, the plunger 153 will be returned to its original position so that it can again be actuated when a container with a cap thereon moved into the sealing position. By rotating the knurled knob 136, the valve housing 130 may be moved to various positions. This will move the trigger 157 to various positions relative to the plates 68 and 90. This adjustment is desirable to compensate for variations in the sizes of caps applied to different size containers.

As previously indicated, the conveyor moves continuously. However, when the cap is being forced onto the container it is necessary that movement of the container along with the conveyor be interrupted. This is accomplished with the following structure.

As shown in Figures 7 and 8, at a point beneath the sealing head unit, the bottoms of the grooves 10, through which the chains 11 pass, are formed by longitudinally extending vertically movable members 166. These members are disposed in longitudinally extending slots formed in the plate 9. Each of the members 166 has a pin 167 depending therefrom and adjacent each end thereof. Each of these pins is threaded onto the member 166 as at 168, and has a head 169 formed on its lower end. Each of the members 167 passes through an opening 170 formed in a support 171. Two of these supports 171 are provided and each is U-shaped. Each support 171 is secured to the lower surface of the plate 9 by means of bolts 172. In surrounding relationship to each pin 167 is a compression spring 173. Each spring bears against the lower surface of the member 166 and against the member 171. These springs serve to keep the members 166 flush with the bottom of the grooves 10 until the sealing operation takes place. When force is applied to the cap by the downwardly moving plate 68, in order to force the cap on the container, the chains 11 will be forced downwardly causing the members 166 also to be forced downwardly against the action of the springs 173. This will permit the lower end of the container to contact firmly with the portion 174 of plate 9 which is disposed between the two chains, as indicated in Figure 7. The chains 11 will continue to move beneath the container during the sealing operation. However, as soon as the sealing operation is completed, the members 166 will return to their original positions, lifting the chains 11 again into engagement with the bottom of the container. The sealed container will then be moved along with the conveyor again.

From the preceding description, the operation of the entire machine will be well understood. The conveyor will be continuously driven and the sealing head unit 4 and the cap feeding and applying unit 3 will be properly adjusted to accommodate the containers and caps to be used. The containers will be placed indiscriminately on the conveyor which will move them between the guides 33 so that they will be in proper alignment with the units 3 and 4. The containers will then be moved along and as they pass beneath the unit 3, each container will withdraw a cap from the supports 67 and 67a as previously described. The container with the cap loosely thereon will then be moved beneath the sealing head unit. When the container moves beneath the plate 90, the magnet serves to lift the cap slightly after it slides off members 67b. However, the upper end of the container will still engage the skirt of the cap and will move it along therewith. As soon as the cap contacts the trigger 157, the control valve will be actuated to apply steam to the cylinder and piston units 69 which will force the plate 68 downwardly. This will force the cap onto the container, as previously indicated. Thus, as the container moves into sealing position, it will automatically actuate the sealing head unit provided a cap is disposed on the upper end of the container. Before the cap is forced on the container, the cap is sterilized and the air in the upper end of the container is displaced by steam. This is accomplished by the steam jets 111. The steam is preferably at a low velocity so as not to entrain air.

In sealing the cap on the container, forcing of the rubber gasket over the upper end of the container in itself serves to hold the cap on the container. However, the condensation of the steam trapped in the head space in the container beneath the cap, which occurs immediately, produces a partial vacuum which is the main force serving to hold the cap on the jar and which also aids in preventing spoilage of the contents of the container. The sealing occurs substantially simultaneously with the injection of the steam into the container and, consequently, the steam will not have much chance of escaping from the container before it is sealed. During the sealing operation, movement of the container along with the conveyor is interrupted. However, immediately after the sealing operation occurs, the container will again be moved along with the continuously moving conveyor and will be moved away from sealing position. As previously stated, the container sealing mechanism will not function if a container which has no cap thereon passes therebeneath.

Figure 10:
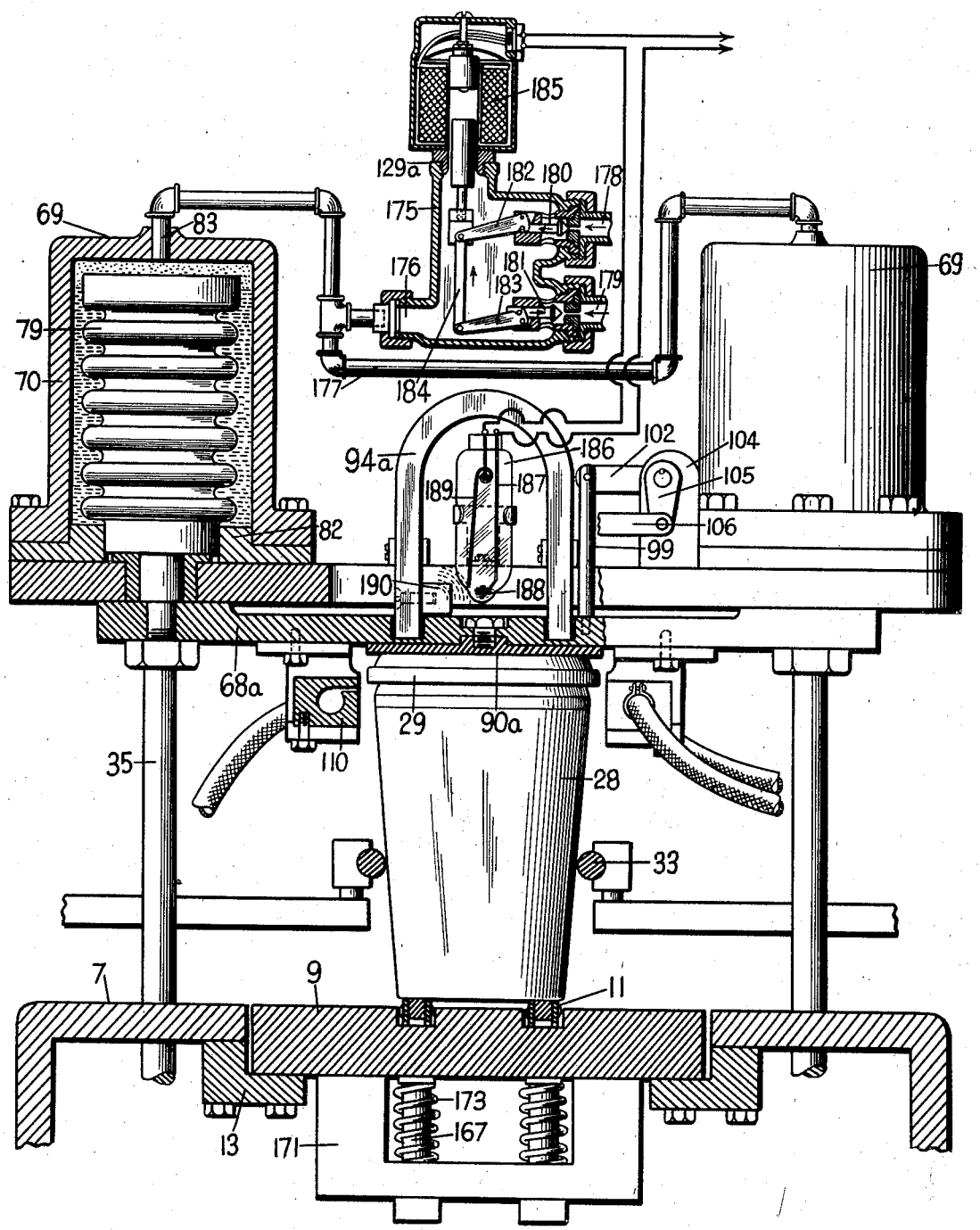
Figure 10 is a view partly in vertical section and partly in end elevation showing the slightly different form of sealing head unit.

In Figure 10, I illustrate a slightly modified form of my machine. In this instance, all parts of the machine are practically the same as before with the exception of the controlling means for the cylinder and piston units 69 which actuate the sealing head unit. In this form of my invention, the flow of steam to and from the units 69 is controlled by a solenoid actuated valve 129a. This valve 129a comprises a housing 175. This housing is provided with an outlet 176 which is connected to the units 69 by suitable piping 177. The housing 175 is also provided with a steam inlet 178, which is suitably connected to a suitable source of steam, and a steam exhaust opening 179. The opening 178 is controlled by a valve 180 while the opening 179 is controlled by a valve 181. The valve 180 is actuated by a pivoted lever 182 while the valve 181 is actuated by a pivoted lever 183. The levers 182 and 183 are connected together by a link 184 so that they will operate simultaneously. For moving these levers, I provide a solenoid 185. Normally the valve 180 is closed and the valve 181 is open. However, when the solenoid 185 is energized, the valve 180 will be open and the valve 181 will be closed. This will permit the steam to enter through inlet 178 and to flow through the outlet 176 to the two units 69. When the solenoid is deenergized, the valve 180 will again be closed and the valve 181 will be open. The steam will exhaust from the unit 69 into the housing 175 and out through the exhaust opening 179.

In order to energize and deenergize the solenoid 185, a mercury switch 186 is provided. This switch is associated with the magnet 94a. This magnet is carried by the plate 34. The switch 186 is provided with a stationary contact 187 which normally has its lower end in the mercury in the bottom of the switch, as indicated at 188. The switch also comprises a movable spring contact 189. This spring contact has a tendency to move into vertical position so that its lower end will be in the mercury. However, this tendency is overcome by the magnetic force exerted by the magnet 94a through the medium of an extension 190. Thus, the magnet holds it in the position indicated in Figure 10 out of the mercury. Consequently, the solenoid 185 will be deenergized. However, as soon as a cap moves beneath the plate 90a, which is of non-magnetic material, the magnetic force exerted on the contact 189 is decreased. The spring contact 189 will then swing into vertical position so that its lower end will pass into the mercury. This will complete the circuit to the solenoid 185. When the solenoid is actuated, the sealing head unit will be actuated, as previously described. As soon as the plate 68a, which is of non-magnetic material, and plate 90a move downwardly away from the magnet 94a to seal the cap on a container, the magnet will again exert sufficient force on the spring contact 189 to swing its lower end out of the mercury, due to the movement of the cap away from the poles of the magnet. Thus, the solenoid will again be deenergized.

It will be apparent from the above description that I have provided a greatly simplified apparatus for applying and sealing closures on containers. The caps are first positioned on the containers loosely, are then lifted and the upper portion of the containers vacuumized and sterilized and simultaneously the caps are sterilized, and then the caps are forced into engagement with the containers. The containers will be vacuumized and sealed quickly and effectively. The machine is very simple and can be built at a comparatively low cost. Due to the fact that steam is not only used for the sterilizing and vacuumizing operations but is also used as the power for operating the sealing head unit, simplification of the machine is facilitated. The machine can be adjusted readily to operate upon containers of various sizes and to use caps of various sizes.

Many other advantages will be apparent from the preceding description, the drawings and the following claims.

Having thus described my invention, what I claim is:

1. Apparatus for closing and sealing openmouth containers which comprises a continuously moving conveyor for moving containers which have skirted caps loosely applied to the mouths thereof, means for lifting the cap from each container in such a manner that the skirt will still surround the end thereof and the cap will be moved along with the container by contact of the container with the skirt, means for forcing steam between the cap and the upper end of the container, steam-actuated means for sealing the cap on the container, and means for interrupting movement of the container with the conveyor during the sealing operation.

2. Apparatus for closing and sealing openmouth containers which comprises a continuously moving conveyor for moving containers which have skirted caps loosely applied to the mouths thereof, means for lifting the cap from each container in such a manner that the skirt will still surround the end thereof and the cap will be moved along with the container by contact of the container with the skirt, means for forcing steam between the cap and the upper end of the container, a steam-actuated sealing head associated with the conveyor and adapted to force the cap on the container, means for controlling the supply of steam to said head, and means for interrupting movement of the container with the conveyor during the sealing operation.

3. Apparatus for closing and sealing openmouth containers which comprises a continuously moving conveyor for moving containers which have caps loosely applied to the mouths thereof, means for lifting the cap from each container, means for forcing steam between the cap and the upper end of the container, a steam-actuated sealing head associated with the conveyor and adapted to force the cap on the container, means for controlling the supply of steam to said head, and means for interrupting movement of the container with the conveyor during the sealing operation.

4. Apparatus for closing and sealing openmouth containers comprising a conveyor for supporting the containers, a sealing head unit disposed above the conveyor, said sealing head unit comprising a sealing head adapted to be moved downwardly relative to the conveyor, a fluid cylinder for moving said head downwardly, a valve for controlling the supply of fluid to said cylinder, and a control member for actuating said valve, said control member being so disposed that it will be engaged by a cap on a container moved into position beneath the sealing head by said conveyor.

5. Apparatus for closing and sealing openmouth containers comprising a support for the container, a sealing head unit disposed above the support, said sealing head unit comprising a sealing head adapted to be moved downwardly relative to the support, a fluid cylinder for moving said head downwardly, a valve for controlling the supply of fluid to said cylinder, and a control member for actuating said valve, said control member being so disposed that it will be engaged by a cap on a container moved into position beneath the sealing head on said support.

6. Apparatus for closing and sealing open-mouth containers comprising a support for the container, a sealing head unit associated with the support, fluid-actuated means for operating said sealing head unit, a valve for controlling the supply of fluid to said means, and a control member for actuating said valve, said control member being so disposed that it will be engaged by a cap on a container in sealing position on said support.

7. Apparatus for closing and sealing open-mouth containers comprising a continuously moving conveyor for supporting the containers, a cap feeding and applying unit disposed above the conveyor for applying caps loosely to the mouths of the containers as they are moved beneath said unit, a sealing head unit disposed above the conveyor, said sealing head unit comprising a sealing head adapted to be moved downwardly relative to the conveyor, a fluid cylinder for moving said head downwardly, a valve for controlling the supply of fluid to said cylinder, a control member for actuating said valve, said control member being so disposed that it will be engaged by a cap on a container moved into position beneath the sealing head by said conveyor, and means for interrupting movement of the container along with the conveyor during the sealing operation.

8. Apparatus for closing and sealing open-mouth containers comprising a continuously moving conveyor for supporting the containers, a sealing head unit disposed above the conveyor, said sealing head unit comprising a sealing head adapted to be moved downwardly relative to the conveyor, a fluid cylinder for moving said head downwardly, a valve for controlling the supply of fluid to said cylinder, a control member for actuating said valve, said control member being so disposed that it will be engaged by a cap on a container moved into position beneath the sealing head by said conveyor, and means for interrupting movement of the container along with the conveyor during the sealing operation.

9. Apparatus for closing and sealing open-mouth containers comprising a conveyor for supporting the containers, a cap feeding and applying unit disposed above the conveyor for applying caps loosely to the mouths of the containers, a sealing head unit disposed above the conveyor, said sealing head unit comprising a sealing head adapted to be moved downwardly relative to the conveyor, a fluid cylinder for moving said head downwardly, a valve for controlling the supply of fluid to said cylinder, and a control member for actuating said valve, said control member being so disposed that it will be engaged by a cap on a container moved into position beneath the sealing head by said conveyor.

10. Apparatus for closing and sealing open-mouth containers comprising a conveyor for supporting the containers, a cap feeding and applying unit disposed above the conveyor for applying caps loosely to the mouths of the containers, a sealing head unit disposed above the conveyor, said sealing head unit being steam-actuated, control means for supplying steam to said sealing head unit, said control means being actuated by movement of a container on the conveyor into position beneath the sealing head unit, and means for causing said cap feeding and applying unit to operate in response to operation of said sealing head unit.

11. Apparatus for closing and sealing open-mouth containers comprising a continuously moving conveyor for supporting the containers, a cap feeding and applying unit disposed above the conveyor for applying caps loosely to the mouths of the containers as they are moved beneath said unit, a sealing head unit disposed above the conveyor, said sealing head unit comprising a sealing head adapted to be moved downwardly relative to the conveyor, a fluid cylinder for moving said head downwardly, a valve for controlling the supply of fluid to said cylinder, a control member for actuating said valve, said control member being so disposed that it will be engaged by a cap on a container moved into position beneath the sealing head by said conveyor, means for interrupting movement of the container along with the conveyor during the sealing operation, and means for causing said cap feeding and applying unit to operate in response to movement of said sealing head.

12. Apparatus for closing and sealing open-mouth containers comprising a conveyor for supporting the containers, a cap feeding unit disposed above the conveyor, a sealing head unit disposed above the conveyor, said sealing head unit comprising a sealing head adapted to be moved downwardly relative to the conveyor, a fluid cylinder for moving said head downwardly, a valve for controlling the supply of fluid to said cylinder, a control member for actuating said valve, said control member being so disposed that it will be engaged by a cap on a container moved into position beneath the sealing head by said conveyor, and means for causing said cap feeding unit to operate in response to movement of said sealing head.

13. Apparatus for closing and sealing open-mouth containers comprising a conveyor for supporting the containers, a cap feeding and applying unit disposed above the conveyor for applying caps loosely to the mouths of the containers, a sealing head unit disposed above the conveyor, said sealing head unit comprising a sealing head adapted to be moved downwardly relative to the conveyor, means associated with said sealing head unit for spacing the cap from the container and for supplying steam between the cap and the upper end of the container, a steam cylinder for moving said head downwardly, a valve for controlling the supply of steam to said cylinder, and a control member for actuating said valve, said control member being so disposed that it will be engaged by a cap on a container moved into position beneath the sealing head by said conveyor.

14. Apparatus for closing and sealing open-mouth containers comprising a continuously moving conveyor for supporting the containers, a cap feeding and applying unit disposed above the conveyor for applying caps loosely to the mouths of the containers as they are moved beneath said unit, a sealing head unit disposed above the conveyor, said sealing head unit adapted to be moved downwardly relative to the conveyor, means associated with said sealing head unit for spacing the cap from the container and for supplying steam between the cap and the upper end of the container, a steam cylinder for moving said head downwardly, a valve for controlling the supply of steam to said cylinder, a control member for actuating said valve, said control member being so disposed that it will be engaged by a cap on a container moved into position beneath the sealing head by said conveyor, and means for interrupting movement of the container along with the conveyor during the sealing operation.

15. Apparatus for closing and sealing open-mouth containers comprising a conveyor for supporting the containers, a cap feeding and applying unit disposed above the conveyor for applying caps loosely to the mouths of the containers, a sealing head unit disposed above the conveyor, means associated with said sealing head unit for spacing the cap from the container and for supplying steam between the cap and the upper end of the container, said sealing head unit being steam-actuated, control means for supplying steam to said sealing head unit, said control means being actuated by movement of a container on the conveyor into position beneath the sealing head unit, and means for causing said cap feeding and applying unit to operate in response to operation of said sealing head unit.

16. Apparatus for closing and sealing open-mouth containers comprising a conveyor for supporting the containers, a cap feeding and applying unit disposed above the conveyor for applying caps loosely to the mouths of the containers, a sealing head unit disposed above the conveyor, said sealing head unit comprising a sealing head adapted to be moved downwardly relative to the conveyor, means associated with said sealing head unit for spacing the cap from the container and for supplying steam between the cap and the upper end of the container, a steam cylinder for moving said head downwardly, a valve for controlling the supply of steam to said cylinder, a control member for actuating said valve, said control member being so disposed that it will be engaged by a cap on a container moved into position beneath the sealing head by said conveyor, and means for causing said cap feeding and applying unit to operate in response to movement of said sealing head.

17. Apparatus for closing and sealing open-mouth containers comprising a continuously moving conveyor for supporting the containers, a cap feeding and applying unit disposed above the conveyor for applying caps loosely to the mouths of the containers as they are moved beneath said unit, a sealing head unit disposed above the conveyor, said sealing head unit comprising a sealing head adapted to be moved downwardly relative to the conveyor, means associated with said sealing head unit for spacing the cap from the container and for supplying steam between the cap and the upper end of the container, a steam cylinder for moving said head downwardly, a valve for controlling the supply of steam to said cylinder, a control member for actuating said valve, said control member being so disposed that it will be engaged by a cap on a container moved into position beneath the sealing head by said conveyor, means for interrupting movement of the container along with the conveyor during the sealing operation, and means for causing said cap feeding and applying unit to operate in response to movement of said sealing head.

18. Apparatus for closing and sealing containers comprising a continuously moving conveyor, said conveyor comprising a chain which moves over a supporting plate, a sealing head disposed in position above said conveyor for sealing containers disposed on said conveyor, means for moving said sealing head downwardly relative to the conveyor to seal the container, said supporting plate of the conveyor being provided with a movable section disposed below the sealing head to permit downward flexing of the chain relative to the plate so that movement of the container with the conveyor during the sealing operation is interrupted.

19. Apparatus for closing and sealing open-mouth containers comprising a continuously moving conveyor for supporting the containers, a cap feeding and applying unit disposed above the conveyor for applying caps loosely to the mouths of the containers as they are moved beneath said unit, a sealing head unit disposed above the conveyor, said sealing head unit adapted to be moved downwardly relative to the conveyor, means associated with said sealing head unit for spacing the cap from the container and for supplying steam between the cap and the upper end of the container, a fluid-actuated cylinder for moving said head downwardly, a valve for controlling the supply of fluid to said cylinder, means for actuating said valve when a container with a cap thereon is moved into position beneath the sealing head by said conveyor, and means for interrupting movement of the container along with the conveyor during the sealing operation.

20. Apparatus of the type described comprising a support for a container which has a cap positioned loosely on the upper end thereof, a sealing head disposed above the support, means for moving said container and the sealing head relative to each other to seal the cap on the container, a control unit for controlling said moving means, said control unit including means for lifting the cap from the container substantially into contact with said sealing head, and a trigger for initiating movement of said moving means which is so disposed that it will be engaged by the cap while the cap is so lifted.

21. Apparatus of the type described comprising a moving conveyer for supporting containers which have caps loosely positioned on the upper ends thereof, a sealing head disposed above the conveyer, means for interrupting movement of each successive container by the conveyer and for moving each successive container and the sealing head relative to each other in a direction axially of the container to force the cap on the container, a control unit for controlling said moving means, said control unit including means for lifting the cap from the container substantially into contact with said sealing head upon movement of the container by the conveyer into association with said sealing head, and a trigger for initiating movement of said moving means which is so disposed that it will be engaged by the cap only while the cap is so lifted.

WILLIAM D. BELL.